United States Patent [19]
Park et al.

[11] Patent Number: 5,867,320
[45] Date of Patent: Feb. 2, 1999

[54] LENS UNIT FOR PROJECTOR

[75] Inventors: Joon-soo Park; Dong-ha Kim, both of Suwon, Rep. of Korea

[73] Assignee: Samsung Electronics Co., Ltd., Kyungki-do, Rep. of Korea

[21] Appl. No.: 907,630

[22] Filed: Aug. 8, 1997

[30] Foreign Application Priority Data

Aug. 19, 1996 [KR] Rep. of Korea ................. 1996-34284

[51] Int. Cl.[6] ............................ G02B 27/10; F21V 7/04
[52] U.S. Cl. ............................................ 359/618; 362/32
[58] Field of Search ............................. 359/618; 362/368, 362/32; 349/5

[56] References Cited

U.S. PATENT DOCUMENTS 4,918,583  4/1990  Kudo et al. ............................ 362/268
5,170,454  12/1992  Kanai ........................................ 385/88
5,748,376  5/1998  Lin et al. .................................. 359/629

*Primary Examiner*—Georgia Epps
*Assistant Examiner*—Ricky Mack
*Attorney, Agent, or Firm*—Sughrue, Mion, Zinn, Macpeak & Seas, PLLC

[57] ABSTRACT

A lens unit, for a projector, includes a scrambler which converts light input from a lamp into a uniform light. An image lens unit is arranged on an optical path between the scrambler and a liquid crystal display (LCD) panel for generating an image. The image lens unit allows the light passing through the scrambler to be emitted to the entire surface of the LCD panel. A collimating lens is arranged on the optical path between the image lens and the LCD panel and is provided for converting the light passing through the image lens into a parallel beam. The image lens unit consists of a first image lens of a positive power and a second image lens of a positive power.

5 Claims, 2 Drawing Sheets

LENS UNIT FOR PROJECTOR

BACKGROUND OF THE INVENTION

The present invention relates to a lens unit for a projector and, more particularly, to a lens unit for a projector having two image lenses between a lamp and a liquid crystal display (LCD) panel.

FIG. 1 is a view schematically showing the optical arrangement of a conventional projector in which four image lenses are provided to represent a color image with one LCD panel. As shown in the drawing, while passing through an aperture member 12, the light emitted from a lamp 10 and reflected by a parabolic mirror 11 becomes a rectangular light having a ratio corresponding in length and width to a screen (not shown). The light becomes a uniform light as it passes through a scrambler 13, and then is inputted to an image generating means after passing an image lens 14, a hot mirror 15 for allowing infrared light to pass and a collimating lens 16 for converting the input light into a parallel beam. The image generating means includes polarizing plates 17 and an LCD panel 18 disposed between the polarizing plates 17 for generating an image as the input parallel beam passes through the rear side thereof. The image generated from the image generating means passes a condensing lens 19 and a projecting lens unit 20 comprising a mirror 21 and a plurality of lenses 22 for determining the degree of focus and magnification ratio of the image. Thereafter, the light is reflected off of a total reflection mirror 23 arranged at a predetermined angle behind the screen inside a cabinet (not shown), and thus magnified and projected to the screen.

The image lens 14 and the collimating lens 16 are optical members for uniformly distributing the uniform light passing through the scrambler 13 to the entire surface of the LCD panel 18. The image lens 14 magnifies the light passing through the scrambler 13 to a size of the LCD panel 18 and the collimating lens 16 converts the magnified light into a parallel beam. For such functions, the image lens employed in a conventional projector is comprised of four lenses. In such a case, however, the arrangement of optical elements is restricted and product costs becomes high due to the numerous number of parts.

SUMMARY OF THE INVENTION

To overcome the above problems, it is an object of the present invention to provide a lens unit for a projector in which the number of lenses of the image lens is decreased.

Accordingly, to achieve the above object, there is provided a lens unit for a projector, comprising: a scrambler which converts light inputted from a lamp into a uniform light; an image lens unit, arranged on an optical path between the scrambler and a liquid crystal display (LCD) panel for generating an image, and which allows the light passing through the scrambler to be emitted to the entire surface of the LCD panel, the image lens comprising a first image lens and a second image lens, respectively, each having positive power; and a collimating lens, arranged on the optical path between the image lens unit and the LCD panel, which converts the light passing through the image lens unit into a parallel beam.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE INVENTION

Figure 1:
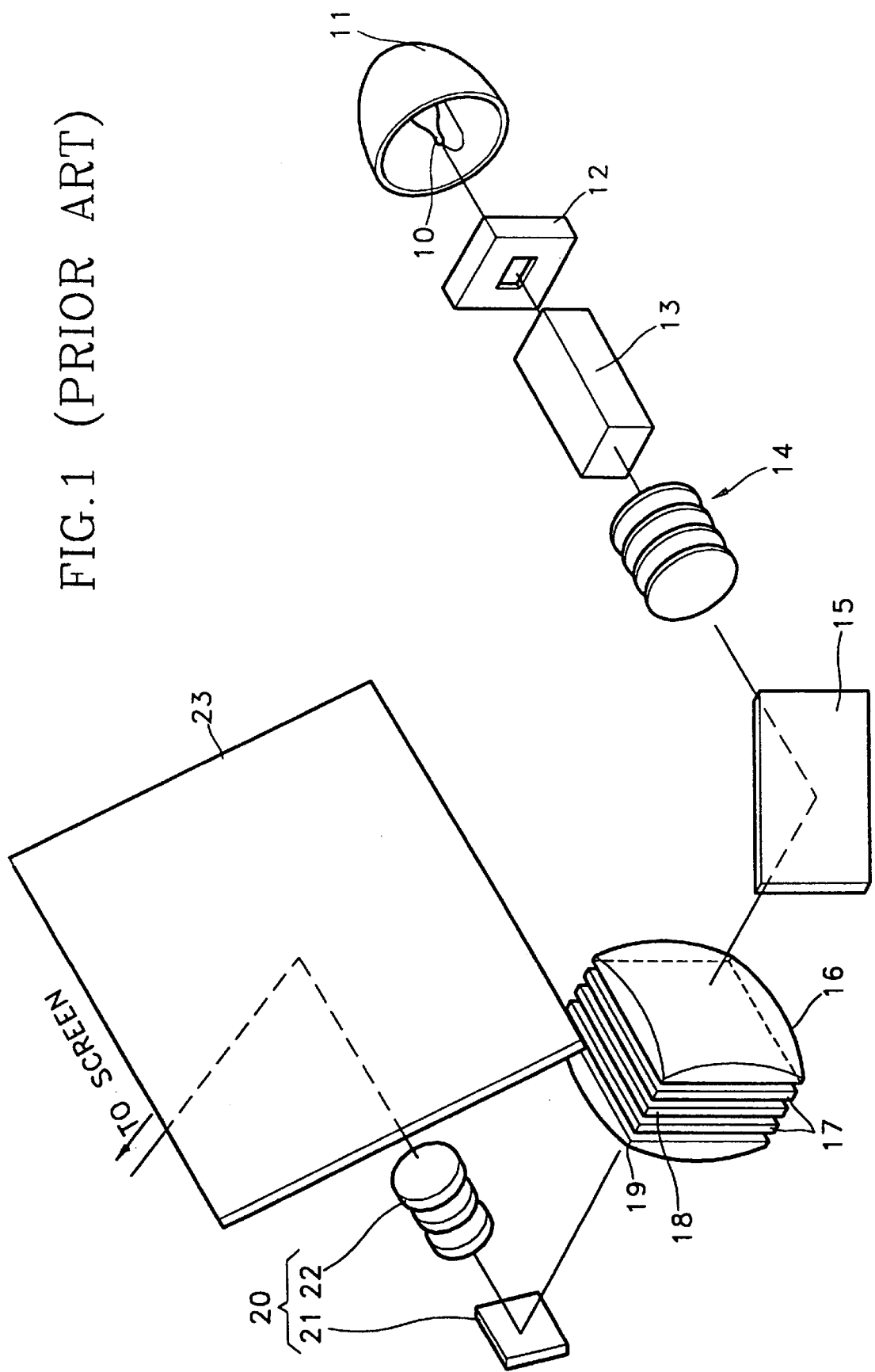
FIG. 1 is a view schematically illustrating the optical arrangement of a conventional projector in which four image lenses are provided.
Figure 2:
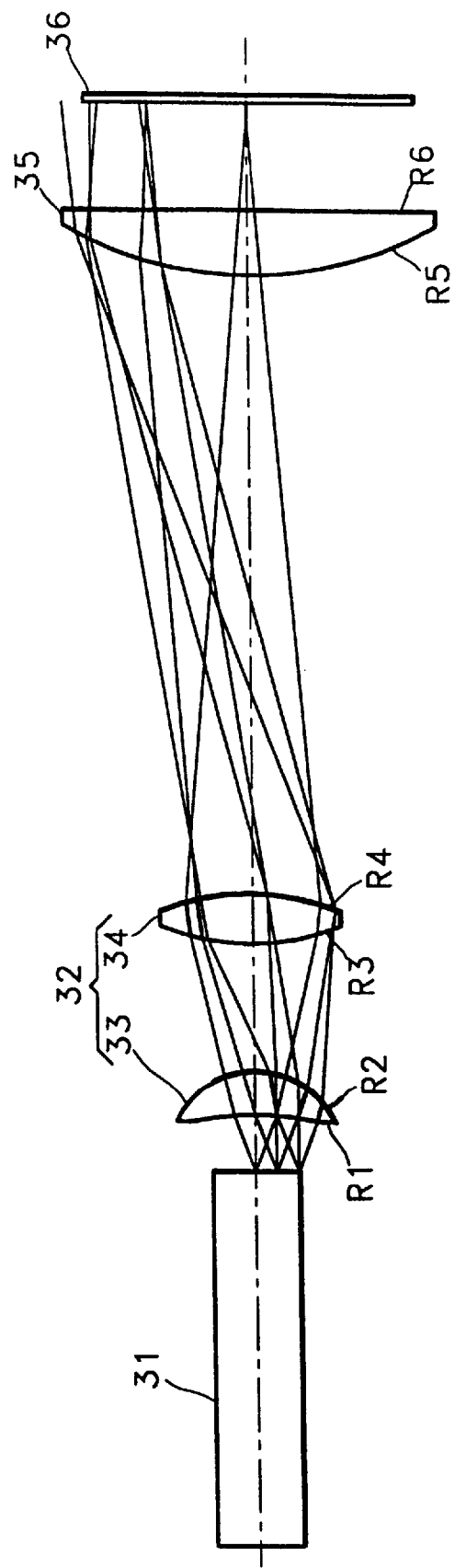
FIG. 2 a diagram schematically illustrating a lens unit for a projector according to the present invention.

As shown in FIG. 2, a lens unit for a projector of the present invention includes a scrambler 31, an image lens unit 32 and a collimating lens 35 sequentially provided along an optical path between the lamp (10 of FIG. 1) and an LCD panel 36.

The scrambler 31 is for improving the uniformity of an input light by diffused-reflection of the light input from the lamp 10. The scrambler 31 has a rectangular-shaped section having the same length-to-width ratio as the LCD panel 36. The image lens unit 32 magnifies the light passing the scrambler 31 to output the magnified light to the entire surface of the LCD panel 36. The image lens unit 32 comprises a first image lens 33 and a second image lens 34 both having positive power. The collimating lens 35 is disposed along the optical path between the image lens 32 and the LCD panel 36 to convert the diverging light which has passed through the second image lens 34 into the parallel light.

In the lens unit according to the present invention, it is preferable that the first and second image lenses 33 and 34 and the collimating lens 35 have the lens data listed in the following Table 1.

<TABLE 1>

|  | RADIUS OF CURVATURE (mm) | LENS THICKNESS AND DISTANCE BETWEEN LENSES (mm) | REFRACTIVE INDEX | DISPERSION |
|---|---|---|---|---|
| FIRST IMAGE LENS | R1 = −40.0000<br>R2 = −17.5662 | D1 = 7.000<br>D2 = 23.4710 |  |  |
| SECOND IMAGE LENS | R3 = 49.0548<br>R4 = −33.9409 | D3 = 8.8000<br>D4 = 110.5861 | 1.5168 | 64.2 |
| COLLIMATING LENS | R5 = 67.4843<br>R6 = ∞ | D5 = 11.4000 |  |  |

In this case, R1, R3 and R5 represent the radii of curvature of an input surface of the respective lenses, and R2, R4 and R6 represent the radii of curvature of an output surface of the respective lenses. Also, D1, D3 and D5 represent the thicknesses of each lens on the optical path. Further, D2 represents the distance between the first image lens 33 and the second image lens 34, and D4 represents the distance between the second image lens 34 and the collimating lens 35.

As described above, the lens unit according to the present invention, which includes two image lenses optically arranged and exhibiting the experimental results as indicated above, provides an optical performance similar to the conventional lens unit having four image lenses. Thus, the number of parts is reduced so that the assembly thereof is made easy and manufacturing costs are reduced.

It is contemplated that numerous modifications may be made to the lens unit of the present invention without departing from the spirit and scope of the invention as defined in the following claims.

What is claimed is:

1. A lens unit for a projector, comprising:

a scrambler which converts light inputted from a lamp into a uniform light;

an image lens unit, arranged on an optical path between said scrambler and a liquid crystal display (LCD) panel for generating an image, consisting of a first image lens and a second image lens, respectively, each having positive power, said image lens unit allowing the light passing through said scrambler to be emitted to the entire surface of said LCD panel; and a collimating lens, arranged on the optical path between said image lens unit and said LCD panel, which converts the light passing through said image lens unit into a parallel beam.

2. The lens unit as claimed in claim 1, wherein said first and said second image lenses and said collimating lens have the following optical arrangement and lens data,

|  | RADIUS OF CURVATURE (mm) | LENS THICKNESS AND DISTANCE BETWEEN LENSES (mm) | REFRACTIVE INDEX | DISPERSION |
|---|---|---|---|---|
| FIRST IMAGE LENS | R1 = −40.0000<br>R2 = −17.5662 | D1 = 7.000<br>D2 = 23.4710 |  |  |
| SECOND IMAGE LENS | R3 = 49.0548<br>R4 = −33.9409 | D3 = 8.8000<br>D4 = 110.5861 | 1.5168 | 64.2 |
| COLLIMATING LENS | R5 = 67.4843<br>R6 = ∞ | D5 = 11.4000 |  |  | wherein, R1, R3 and R5 represent the radii of curvature of an input surface of said respective lenses; R2, R4 and R6 represent the radii of curvature of an output surface of said respective lenses; D1, D3 and D5 represent the thickness of each said lens on the optical path; D2 represents the distance between said first image lens and said second image lens; and D4 represents the distance between said second image lens and said collimating lens.

3. A lens unit for a projector, comprising:

a scrambler which converts light inputted from a lamp into a uniform light;

an image lens unit, arranged on an optical path between said scrambler and a liquid crystal display (LCD) panel for generating an image, comprising a first image lens and a second image lens, respectively, each having positive power, said image lens unit allowing the light passing through said scrambler to be emitted to the entire surface of said LCD panel; and a collimating lens, arranged on the optical path between said image lens unit and said LCD panel, which converts the light passing through said image lens unit into a parallel beam;

wherein said first and said second image lenses and said collimating lens have the following optical arrangement and lens data,

|  | RADIUS OF CURVATURE (mm) | LENS THICKNESS AND DISTANCE BETWEEN LENSES (mm) | REFRACTIVE INDEX | DISPERSION |
|---|---|---|---|---|
| FIRST IMAGE LENS | R1 = −40.0000<br>R2 = −17.5662 | D1 = 7.000<br>D2 = 23.4710 |  |  |
| SECOND IMAGE LENS | R3 = 49.0548<br>R4 = −33.9409 | D3 = 8.8000<br>D4 = 110.5861 | 1.5168 | 64.2 |
| COLLIMATING LENS | R5 = 67.4843<br>R6 = ∞ | D5 = 11.4000 |  |  | wherein, R1, R3 and R5 represent the radii of curvature of an input surface of said respective lenses; R2, R4 and RG represent the radii of curvature of an output surface of said respective lenses; D1, D3 and D5 represent the thickness of each said lens on the optical path; D2 represents the distance between said first image lens and said second image lens; and D4 represents the distance between said second image lens and said collimating lens.

4. A lens unit for a projector, comprising:

a scrambler which converts light inputted from a lamp into a uniform light;

means for magnifying the light from the scrambler, said magnifying light means arranged on an optical path between said scrambler and a liquid crystal display (LCD), said magnifying light means allowing the light passing through said scrambler to be emitted to the entire surface of said LCD panel; and a collimating lens, arranged on the optical path between said magnifying light means and said LCD panel, which converts the light passing through said magnifying light means into a parallel beam.

5. The lens unit for a projector according to claim 4, wherein said magnifying light means comprises a first image lens and a second image lens, respectively, each having positive power.

* * * * *